(12) United States Patent
Minami et al.

(10) Patent No.: US 8,942,909 B2
(45) Date of Patent: Jan. 27, 2015

(54) CONTROL APPARATUS FOR INTERNAL COMBUSTION ENGINE

(75) Inventors: Keitarou Minami, Kariya (JP); Hideaki Ichihara, Obu (JP); Hiroyuki Takezoe, Kariya (JP); Hiroshi Katsurahara, Okazaki (JP)

(73) Assignee: Denso Corporation, Kariya (JP)

( * ) Notice: Subject to any disclaimer, the term of this patent is extended or adjusted under 35 U.S.C. 154(b) by 395 days.

(21) Appl. No.: 13/481,192

(22) Filed: May 25, 2012

(65) Prior Publication Data

US 2012/0303249 A1 Nov. 29, 2012

(30) Foreign Application Priority Data

May 27, 2011 (JP) .................................. 2011-119730

(51) Int. Cl.
| F02D 41/26 | (2006.01) |
| F02M 25/07 | (2006.01) |
| F02D 41/00 | (2006.01) |
| F02D 41/12 | (2006.01) |
| F02D 21/08 | (2006.01) |

(52) U.S. Cl.
CPC .......... *F02D 41/0005* (2013.01); *F02M 25/074* (2013.01); *F02D 41/0072* (2013.01); *Y02T 10/47* (2013.01); *F02M 25/0709* (2013.01); *F02D 2021/083* (2013.01); *Y02T 10/42* (2013.01); *F02D 41/123* (2013.01); *F02M 25/0786* (2013.01)
USPC .. 701/102; 701/112; 123/339.16; 123/568.21

(58) Field of Classification Search
CPC .......... F02D 41/00472; F02D 41/0123; F02D 41/0005; F02D 41/083; F02D 41/0002; F02D 2200/1015; F02M 25/0786

USPC ............. 123/568.21, 568.23, 568.24, 568.25, 123/568.26, 478, 339.1, 339.14, 339.16, 123/339.18; 701/102, 112
See application file for complete search history.

(56) References Cited

U.S. PATENT DOCUMENTS

| 7,975,670 | B2 * | 7/2011 | Ito ............................ 123/339.11 |
| 8,316,828 | B2 * | 11/2012 | Whitney et al. .......... 123/568.16 |
| 2002/0170546 | A1 * | 11/2002 | Itoyama .................... 123/568.27 |
| 2006/0254261 | A1 * | 11/2006 | Ishihara ......................... 60/295 |

(Continued)

FOREIGN PATENT DOCUMENTS

| JP | 01-190922 | 8/1989 |
| JP | 8-61112 | 3/1996 |

(Continued)

OTHER PUBLICATIONS

U.S. Appl. No. 13/480,583 of Minami et al, filed May 25, 2012.

(Continued)

*Primary Examiner* — Hieu T Vo
*Assistant Examiner* — Arnold Castro
(74) *Attorney, Agent, or Firm* — Nixon & Vanderhye PC

(57) ABSTRACT

An intake air quantity information determining arrangement senses or computes one of an intake air quantity and a torque of an internal combustion engine as intake air quantity information. A misfire-avoidance control arrangement executes a misfire-avoidance control operation, which avoids misfire by controlling a throttle opening degree of a throttle valve such that a value of the intake air quantity information does not decrease below a normal combustion threshold value.

9 Claims, 11 Drawing Sheets

(56) References Cited

U.S. PATENT DOCUMENTS

| | | | | |
|---|---|---|---|---|
| 2008/0041339 | A1* | 2/2008 | Nishikiori et al. | 123/406.48 |
| 2009/0234562 | A1* | 9/2009 | Wolf et al. | 701/103 |
| 2010/0263627 | A1* | 10/2010 | Whitney et al. | 123/568.21 |
| 2012/0022770 | A1* | 1/2012 | Soejima et al. | 701/104 |
| 2013/0090839 | A1* | 4/2013 | Ishigami et al. | 701/108 |

FOREIGN PATENT DOCUMENTS

| | | |
|---|---|---|
| JP | 2005-220801 | 8/2005 |
| JP | 2006-275003 | 10/2006 |
| JP | 2008-101626 | 5/2008 |
| JP | 2009-121315 | 6/2009 |
| JP | 2009-185757 | 8/2009 |
| JP | 2010-001796 | 1/2010 |
| JP | 2010-36780 | 2/2010 |
| JP | 2010-203281 | 9/2010 |

OTHER PUBLICATIONS

U.S. Appl. No. 13/481,231 of Nogami et al, filed May 25, 2012.
U.S. Appl. No. 13/480,641 of Takezoe et al, filed May 25, 2012.
Office Action (2 pages) dated Mar. 4, 2014, issued in corresponding Japanese Application No. 2011-119730 and English translation (3 pages).
Office Action (6 pages) dated Oct. 8, 2014, issued in corresponding Chinese Application No. 201210166976.7 and English translation (8 pages).

* cited by examiner

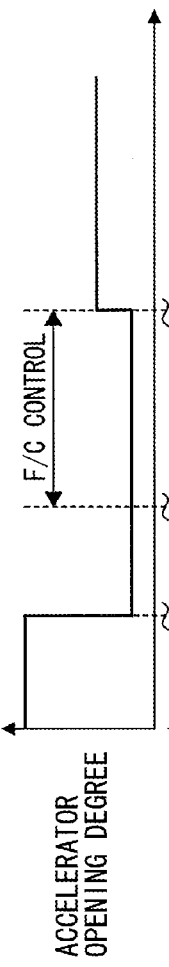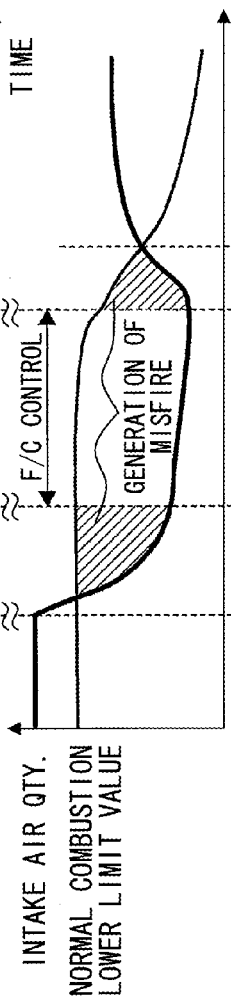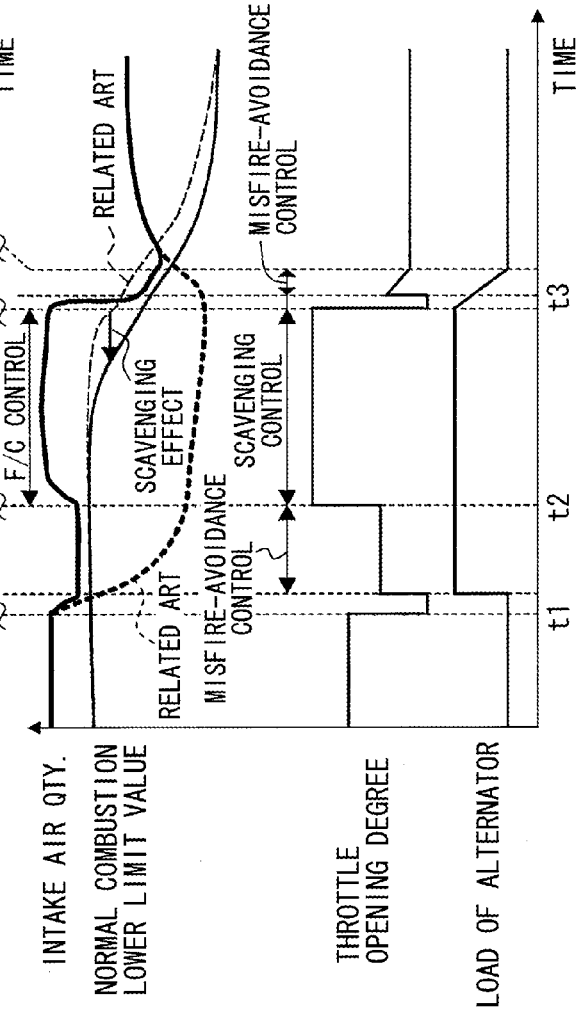

FIG. 10

| INTAKE CONDUIT PRESSURE (kPa) <br> ENGINE SPEED (rpm) | 30 | 40 | ... | ... |
|---|---|---|---|---|
| 700 | × | × | × | × |
| 800 | × | × | × | × |
| ⋮ | × | × | A1, B1 | A2, B2 |
| ⋮ | × | × | A3, B3 | A4, B4 |

× : RANGE WHERE MISFIRE-AVOIDANCE CONTROL OP. IS NOT EXECUTED

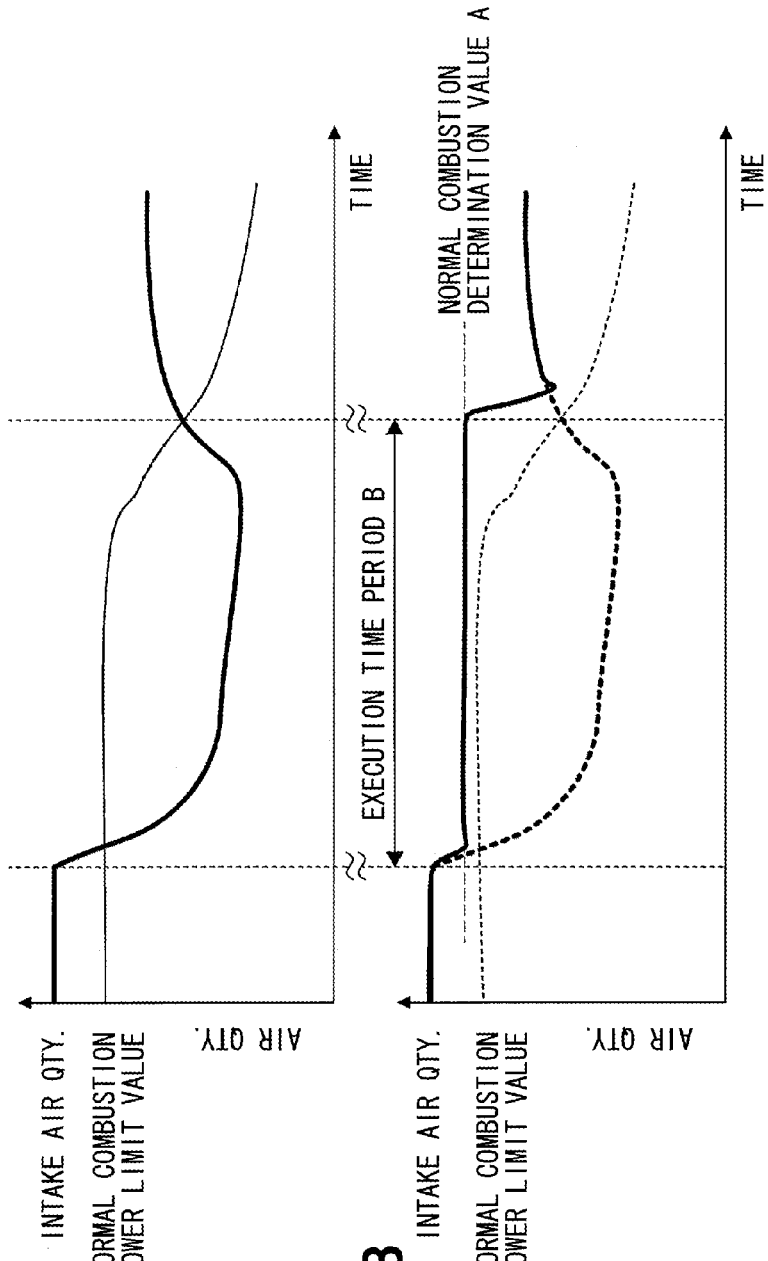

CONTROL APPARATUS FOR INTERNAL COMBUSTION ENGINE

CROSS REFERENCE TO RELATED APPLICATION

This application is based on and incorporates herein by reference Japanese Patent Application No. 2011-119730 filed on May 27, 2011.

TECHNICAL FIELD

The present disclosure relates to a control apparatus for an internal combustion engine provided with an EGR device.

BACKGROUND

There is known an internal combustion engine of a vehicle, which is provided with an EGR device to recirculate a portion of exhaust gas as EGR gas to an intake passage for the purpose of improving fuel consumption and reducing knocking and exhaust emissions of the internal combustion engine.

However, in the internal combustion engine, which is provided with the EGR device, even when an EGR valve is closed at the time of driving a throttle valve to a closing side thereof (at the time of controlling an opening degree of the throttle valve to a closing side), the EGR gas may remain in a portion of an EGR passage located on a downstream side of the EGR valve or in the intake passage in a system. Particularly in a system, which recirculates the EGR gas to a portion of the intake passage located on the upstream side of the throttle valve, a large quantity of the EGR gas may remain in the portion of the intake passage located on the upstream side of the throttle valve. Therefore, in such a system, the quantity of the EGR gas, which flows into a cylinder of the internal combustion engine at the time of decelerating the engine (thereby decelerating the vehicle) or the time of reaccelerating the engine (thereby reaccelerating the vehicle), may be excessively increased to cause a deterioration of a combustion state, thereby possibly resulting in occurrence of misfire.

In view of the above point, dP2010-36780A teaches a technique of limiting combustion deterioration in the internal combustion engine. Specifically, according to the technique of JP2010-36780A, a throttle valve is closed at a speed that is slower than an upper limit valve closing speed, above which the misfire will likely occur (i.e., the throttle opening degree being reduced at a speed that is lower than an upper limit closing speed, above which the misfire will likely occur). In this way, the combustion deterioration is limited.

Here, it should be noted that depending on the operational state immediately before the time of decelerating the engine, a large quantity of EGR gas may be already present in the intake passage at the time of starting the deceleration of the engine. However, technique of JP2010-36780A is a technique that limits the suctioning of the EGR gas by closing the throttle valve at the speed, which is lower than the upper limit closing speed of the throttle valve, and thereby limiting a rapid decrease of the intake conduit pressure (a rapid increase of an intake conduit negative pressure). In the case where the large quantity of EGR gas is already present in the intake passage at the time of starting the deceleration of the engine, the quantity of the EGR gas, which flows into the cylinder, becomes excessively large according to this technique, thereby possibly resulting in misfire. Furthermore, the above technique cannot counteract with a case where the EGR gas remains in the intake passage until the time of reaccelerating the engine after the execution of the deceleration of the engine, thereby possibly resulting in occurrence of misfire at the time of reacceleration of the engine.

SUMMARY

The present disclosure addresses the above disadvantages.

According to the present disclosure, there is provided a control apparatus for an internal combustion engine that is provided with an exhaust gas recirculation (EGR) device, which recirculates a portion of exhaust gas of the internal combustion engine as EGR gas to an intake passage of the internal combustion engine. The control apparatus includes an intake air quantity information determining arrangement, a normal combustion threshold value computing arrangement and a misfire-avoidance control arrangement. The intake air quantity information determining arrangement senses or computes one of an intake air quantity and a torque of the internal combustion engine as intake air quantity information. The normal combustion threshold value computing arrangement computes a normal combustion threshold value based on an operational state of the internal combustion engine. The normal combustion threshold value is a threshold value of the intake air quantity information required to be achieved to enable normal combustion in the internal combustion engine. The misfire-avoidance control arrangement executes a misfire-avoidance control operation, which avoids misfire by controlling a throttle opening degree of a throttle valve such that a value of the intake air quantity information (i.e., a value of the intake air quantity or a value of the torque, which is sensed or computed by the intake air quantity information determining arrangement) does not decrease below the normal combustion threshold value.

The control apparatus may further include a cylinder-inflow EGR gas quantity determining arrangement that estimates or senses a value of a cylinder-inflow EGR gas quantity, which is a quantity of the EGR gas that flows into a cylinder of the internal combustion engine, wherein the normal combustion threshold value computing arrangement computes the normal combustion threshold value based on the value of the cylinder-inflow EGR gas quantity.

The cylinder-inflow EGR gas quantity determining arrangement may estimate and store a value of an EGR gas flow quantity of a portion of the EGR gas that is present between a first location of the intake passage, which is on a downstream side of an EGR valve of the EGR device, and a second location of the intake passage, which is on an upstream side of the cylinder, based on an EGR valve-passing gas flow quantity, which is a quantity of the portion of the EGR gas passed through the EGR valve. The cylinder-inflow EGR gas quantity determining arrangement may estimate the value of the cylinder-inflow EGR gas quantity based on the stored value of the EGR gas flow quantity of the portion of the EGR gas.

BRIEF DESCRIPTION OF THE DRAWINGS

The drawings described herein are for illustration purposes only and are not intended to limit the scope of the present disclosure in any way.

FIG. 4A is a diagram showing a change in a throttle opening degree with time;

FIG. 4B is a diagram showing a change in an intake air quantity and a change in a normal combustion lower limit value with time in a comparative example;

FIG. 4C is a diagram showing a change in an intake air quantity, a change in a normal combustion lower limit value, a change in a throttle opening degree and a change in a load torque of an alternator with time according to the first embodiment;

FIG. 10 is a diagram showing an exemplary map, which indicates a normal combustion determination value and an execution time period in relation to an intake conduit pressure and an engine rotational speed according to the second embodiment;

FIG. 11A is a diagram showing a change in an intake air quantity and a change in a normal combustion lower limit value with time in the comparative example; and FIG. 11B is a diagram showing a change in an intake air quantity and a change in a normal combustion lower limit value with time according to the second embodiment.

DETAILED DESCRIPTION

Embodiments of the present disclosure will be described with reference to the accompanying drawings.

First Embodiment

A first embodiment of the present disclosure will be described with reference to FIGS. 1 to 8.

Figure 1:
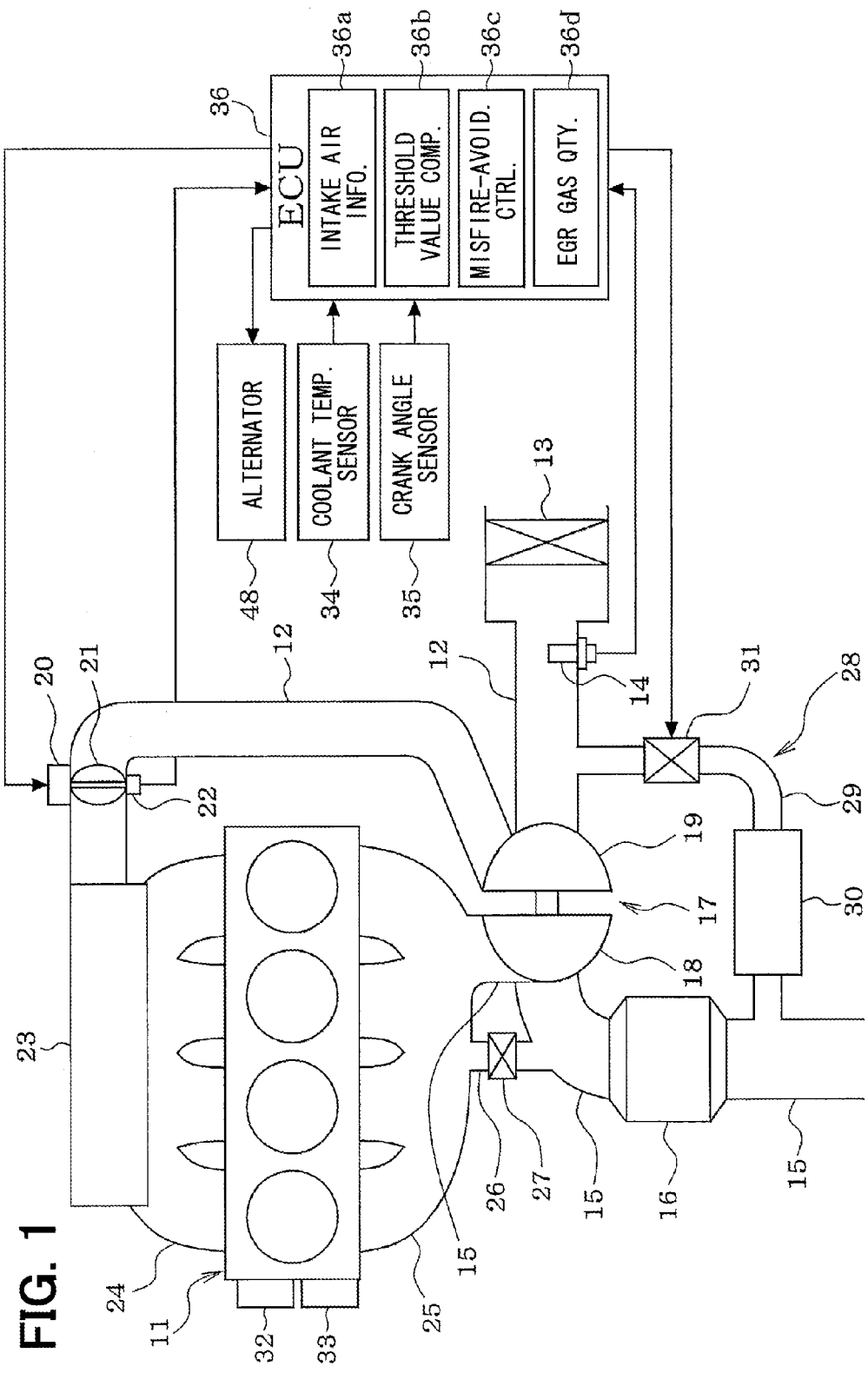
FIG. 1 is a schematic diagram showing a structure of an engine control system, which controls an internal combustion engine provided with a supercharger, according to a first embodiment of the present disclosure.

First of all, a structure of an engine control system, which controls an internal combustion engine provided with a supercharger, will be described with reference to FIG. 1.

An air cleaner 13 is placed at a furthermost upstream portion of an intake conduit 12 (an intake passage) of the internal combustion engine (hereinafter simply referred to as the engine) 11. An air flow meter 14, which serves as an intake air quantity information determining means, is placed in the intake conduit 12 on the downstream side of the air cleaner 13 in a flow direction of the intake air to sense a flow quantity of the intake air (fresh air). A catalytic converter (e.g., a three-way catalytic converter) 16 is placed in an exhaust conduit 15 (an exhaust passage) of the engine 11 to purify the exhaust gas by converting noxious substances, such as carbon monoxide (CO), hydrocarbon (HC) and nitrogen oxide (NOx) of the exhaust gas into less noxious substances.

An exhaust turbine supercharger 17, which supercharges the intake air, is provided to the engine 11. An exhaust turbine 18 of the supercharger 17 is placed on an upstream side of the catalytic converter 16 in a flow direction of exhaust gas in the exhaust conduit 15. A compressor 19 of the supercharger 17 is placed on a downstream side of the air flow meter 14 in the intake conduit 12. In the supercharger 17, the exhaust turbine 18 and the compressor 19 are coupled with each other to rotate integrally. When the exhaust turbine 18 is rotated by a kinetic energy of the exhaust gas, the compressor 19 is rotated to supercharge the intake air.

A throttle valve 21 and a throttle opening degree sensor 22 are placed on a downstream side of the compressor 19 in the intake conduit 12. The throttle valve 21 is driven by an electric motor 20 to adjust an opening degree thereof. The throttle opening degree sensor 22 senses the opening degree (a throttle opening degree) of the throttle valve 21.

An intercooler, which cools the intake air, is provided integrally with a surge tank 23 (the intake passage) at a location that is on a downstream side of the throttle valve 21. Here, it should be noted that the intercooler may be placed on an upstream side of the surge tank 23 and/or the throttle valve 21, if desired. An intake manifold 24 (the intake passage), which guides the air into the respective cylinders of the engine 11, is provided to the surge tank 23. Furthermore, fuel injection valves (not shown) are provided for the cylinders such that each fuel injection valve (not shown) is adapted to inject fuel into the corresponding cylinder or a corresponding intake port associated with the cylinder. Spark plugs (not shown) are provided for the cylinders, respectively, and are installed to a cylinder head of the engine 11. A mixture of fuel and air in each cylinder is ignited through spark discharge of the spark plug.

An exhaust manifold 25 is connected to an exhaust opening of each cylinder of the engine 11, and a downstream side merging portion of the exhaust manifold 25 is connected to a portion of the exhaust conduit 15, which is located on an upstream side of the exhaust turbine 18. An exhaust gas bypass passage 26 bypasses the exhaust turbine 18 by connecting between a portion of the exhaust manifold 25, which is located on an upstream side of the exhaust turbine 18, and a portion of the exhaust conduit 15, which is located on a downstream side of the exhaust turbine 18. A wastegate valve 27 is installed in the exhaust gas bypass passage 26 to open or close the exhaust gas bypass passage 26.

A low pressure loop exhaust gas recirculation (LPL EGR) device 28 is provided to the engine 11. The EGR device 28 recirculates a part of the exhaust gas as EGR gas from the exhaust conduit 15 into the intake conduit 12. In the EGR device 28, an EGR conduit 29 (an EGR passage) connects between a portion of the exhaust conduit 15, which is located on a downstream side of the catalytic converter 16, and a portion of the intake conduit 12, which is located on an upstream side of the compressor 19. An EGR cooler 30 and an EGR valve 31 are provided in the EGR conduit 29. The EGR cooler 30 cools the EGR gas. The EGR valve 31 adjusts a flow quantity (EGR gas flow quantity) of the EGR gas, which flows through the EGR conduit 29. An opening degree of the EGR valve 31 is adjusted by an actuator (not shown), such as an electric motor. When the EGR valve 31 is opened, the EGR gas is recirculated from the portion of the exhaust conduit 15, which is located on the downstream side of the catalytic converter 16, to the portion of the intake conduit 12, which is located on the upstream side of the compressor 19.

Furthermore, an intake side variable valve timing mechanism 32 and an exhaust side variable valve timing mechanism 33 are provided to the engine 11. The intake side variable valve timing mechanism 32 adjusts, i.e., changes valve timing (opening timing and closing timing) of intake valves (not shown). An alternator (electric power generator) 48 is rotated by a drive force of the engine 11 to generate electric power. A power generation control electric current (field current) of the alternator 48 is duty controlled to control a load torque of the alternator 48.

Furthermore, a coolant temperature sensor 34 and a crank angle sensor 35 are provided to the engine 11. The coolant temperature sensor 34 senses the temperature of engine coolant, which is circulated to cool the engine 11. The crank angle sensor 35 outputs a pulse signal at every predetermined crank angle upon rotation of a crankshaft (not shown). A crank angle and an engine rotational speed are sensed, i.e., are determined based on the output signals of the crank angle sensor 35.

Outputs of the above-described sensors are supplied to an electronic control unit (ECU) 36. The ECU 36 includes a microcomputer as its main component. When the ECU 36 executes engine control programs, which are stored in a ROM (a storage) of the ECU 36, for example, a fuel injection quantity of each fuel injection valve, ignition timing of each spark plug and the opening degree of the throttle valve 21 (an intake air quantity) are controlled based on the engine operational state.

At that time, the ECU 36 computes a target EGR rate based on an engine operational state (e.g., an engine load and the engine rotational speed) and controls the opening degree of the EGR valve 31 to implement the target EGR rate.

Figure 2:
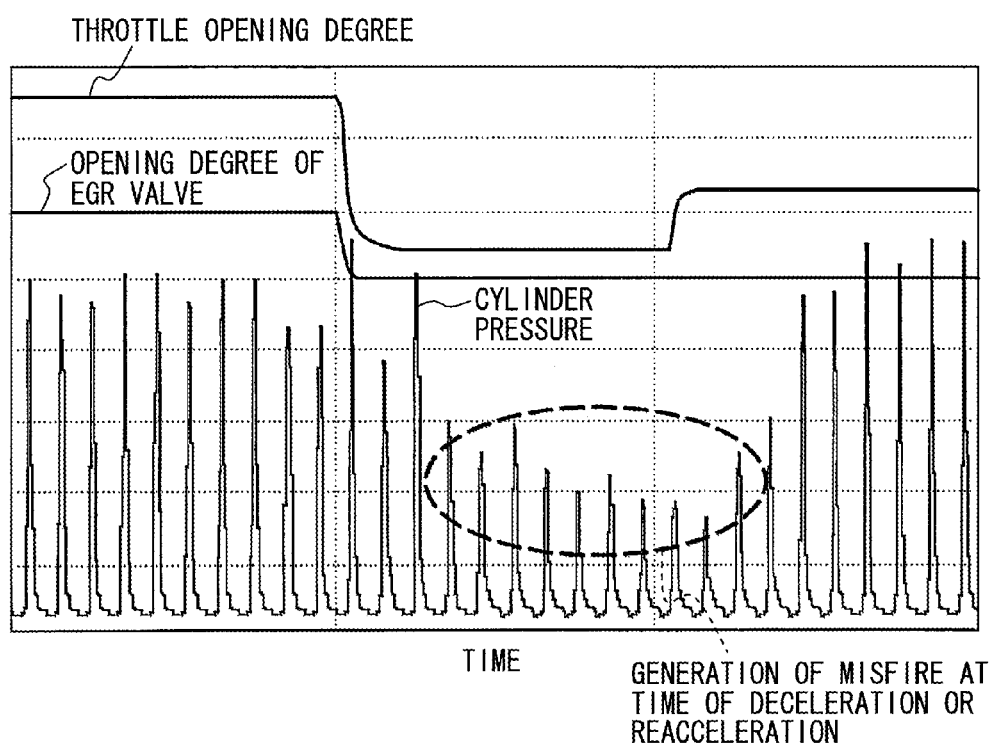
FIG. 2 is a diagram showing a time chart for describing occurrence of misfire caused by EGR gas at the time of decelerating the engine or the time of reaccelerating the engine.

However, as shown in FIG. 2, in the engine 11, which is provided with the EGR device 28, even when the EGR valve 31 is closed at the time of controlling the opening degree of the throttle valve 21 to the closing side thereof during deceleration of the engine (thereby deceleration of the vehicle), the EGR gas remains in the portion of the EGR conduit 29, which is located on the downstream side of the EGR valve 31, as well as in the intake conduit 12. Particularly, in the system, which recirculates the EGR gas to the portion of the intake passage located on the upstream side of the throttle valve 21, a large quantity of the EGR gas may remain in the portion of the intake passage located on the upstream side of the throttle valve 21. Therefore, the quantity of the EGR gas, which flows into the cylinder at the time of deceleration of the engine or at the time of reacceleration of the engine after the deceleration, may become excessively large to cause deterioration of the combustion state of the engine 11, possibly resulting in misfire.

Figure 3:
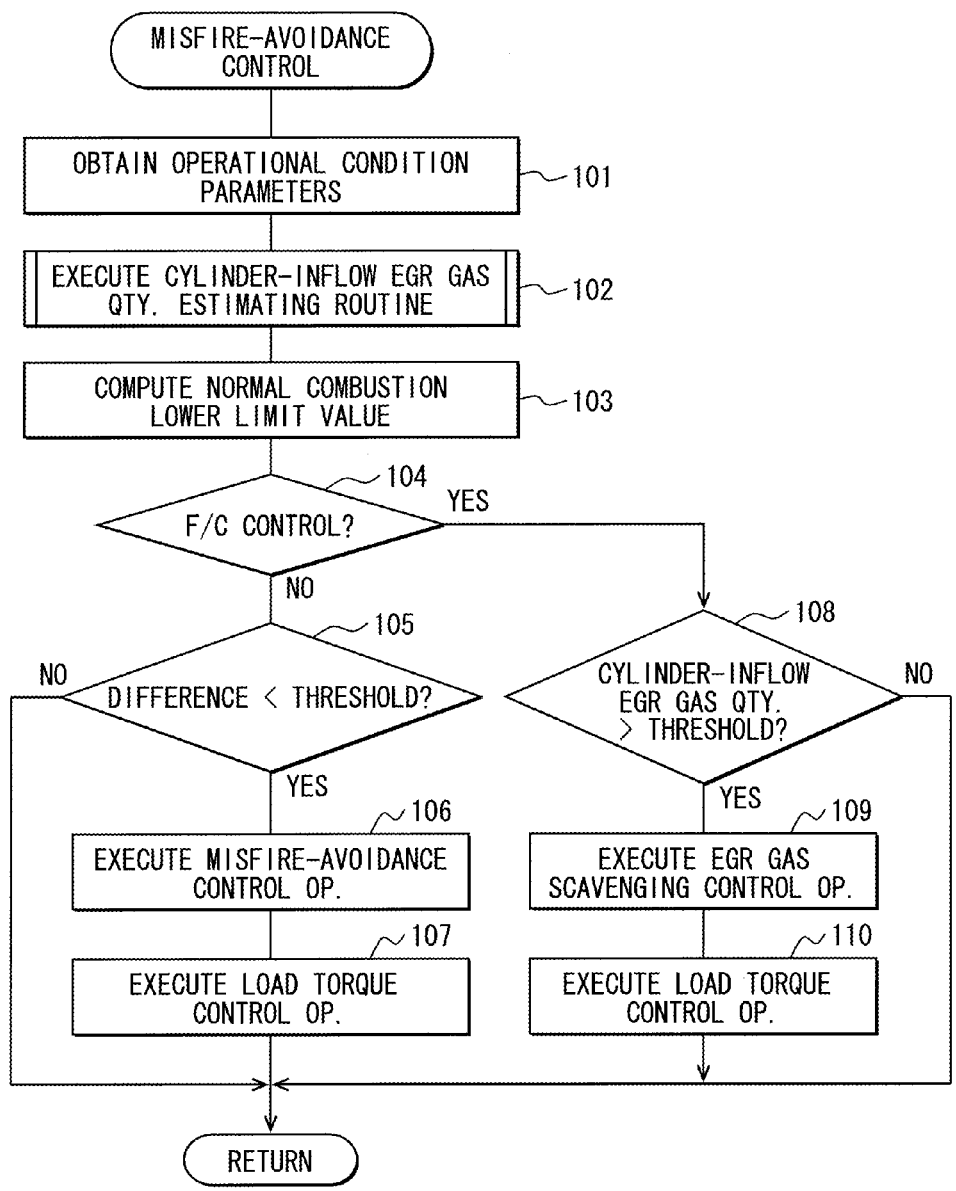
FIG. 3 is a flowchart showing a flow of a misfire-avoidance control routine according to the first embodiment.

According to the first embodiment, in order to address the above disadvantage, the ECU 36 executes a misfire-avoidance control routine (i.e., a misfire-avoidance control process) of FIG. 3. Specifically, as shown in FIG. 4C, a normal combustion lower limit value (a normal combustion threshold value) of the intake air quantity, which is a lower limit value of the intake air quantity that needs to be achieved to enable the normal combustion without causing misfire in the cylinder, is computed based on an estimated cylinder-inflow EGR gas quantity (a quantity of the EGR gas, which flows into the cylinder) that is estimated by using an estimation method (see FIGS. 5 to 8) described later. Then, the misfire-avoidance control operation, which limits the occurrence of the misfire, is executed by controlling the throttle opening degree such that the intake air quantity does not decrease below the normal combustion lower limit value. Also, at the same time, a load torque (e.g., a load torque of the alternator 48) is controlled such that a torque change of the engine 11, which is caused by the misfire-avoidance control operation, is absorbed, i.e., is counteracted.

Furthermore, an EGR gas scavenging control operation, which promotes scavenging of the EGR gas by controlling the throttle opening degree to the opening side (e.g., to the full opening side where the opening degree of the throttle valve 21 becomes a full opening degree), is executed during a fuel cut control operation (F/C control operation), which stops the fuel injection, at the time of decelerating the engine 11. Also, at the same time, the load torque (e.g., the load torque of the alternator 48) is controlled such that a torque change of the engine 11, which is caused by the EGR gas scavenging control operation, is absorbed, i.e., is counteracted.

In place of the cylinder-inflow EGR gas quantity, a cylinder-inflow EGR rate may be used.

Cylinder-Inflow EGR Rate=(Cylinder-inflow EGR Gas Quantity/Total Cylinder-inflow Gas Quantity)

Here, it should be noted that the total cylinder-inflow gas quantity is a sum of the cylinder-inflow fresh air quantity and the cylinder-inflow EGR gas quantity.

The misfire-avoidance control routine of FIG. 3, which is executed by the ECU 36 in the first embodiment, will now be described.

The misfire-avoidance control routine, i.e., the misfire-avoidance control process of FIG. 3 is executed at a predetermined cycle during an ON period of the electric power source of the ECU 36 (a period of turning on of an ignition switch) and serves as a misfire-avoidance control means. When the present routine is started, the operation proceeds to step 101. At step 101, engine operational condition parameters, such as the engine rotational speed and the engine load (e.g., the intake air quantity and the intake conduit pressure) are obtained. In this instance, an intake air quantity information determining arrangement 36a of the ECU 36 senses or computes the intake air quantity (serving as intake air quantity information) based on the output of the air flow meter 14.

Thereafter, the operation proceeds to step 102. At step 102, a cylinder-inflow EGR gas quantity estimating routine (not shown) is executed by a cylinder-inflow EGR gas quantity determining arrangement 36d of the ECU 36 to estimate the cylinder-inflow EGR gas quantity through the estimating method described later (see FIGS. 5 to 8). This process at step 102 may serve as a cylinder-inflow EGR gas quantity determining means.

Thereafter, the operation proceeds to step 103. At step 103, the normal combustion lower limit value (the lower limit of the intake air quantity, which needs to be achieved to enable the normal combustion in the cylinder) is computed by a normal combustion threshold value computing arrangement 36b of the ECU 36 based on the cylinder-inflow EGR gas quantity (the estimated value of the cylinder-inflow EGR gas quantity) by using a map or a mathematical equation. The map or the equation for determining the normal combustion lower limit value is prepared in advance based on experimental data or design data and is stored in the ROM of the ECU 36. This process at step 103 may serve as a normal combustion threshold value computing means.

Thereafter, the operation proceeds to step 104. At step 104, it is determined whether the fuel cut control operation (F/C control operation) is currently executed. When it is determined that the fuel cut control operation is not currently executed (i.e., the fuel injection is currently performed) at step 104, the operation proceeds to step 105. At step 105, it is determined whether a value of difference between the intake air quantity and the normal combustion lower limit value is smaller than a predetermined threshold value. When the intake air quantity is smaller than the normal combustion lower limit value, there is a high possibility of having the misfire. Therefore, it is possible to predict whether the misfire will occur by determining whether the value of difference between the intake air quantity and the normal combustion lower limit value is smaller than the predetermined threshold value.

When it is determined that the value of difference between the intake air quantity and the normal combustion lower limit value is smaller than the threshold value, the operation may proceed to step 106. At step 106, a misfire-avoidance control arrangement 36c of the ECU 36 executes the misfire-avoidance control operation, which avoids the occurrence of the misfire, by controlling the throttle opening degree such that the intake air quantity does not decrease below the normal combustion lower limit value. Specifically, the throttle opening degree is controlled such that the intake air quantity falls in a predetermined range from the normal combustion lower limit value on the side, which is larger than the normal combustion lower limit value. In this way, the intake air quantity is held equal to or larger than the normal combustion lower limit value to limit the occurrence of the misfire.

Thereafter, the operation proceeds to step 107. At step 107, the load torque (e.g., the load torque of the alternator 48) is controlled to absorb, i.e., counteract the torque change caused by the misfire-avoidance control operation. In this way, the torque increase caused by the misfire-avoidance control operation, i.e., the torque increase caused by the increase of the intake air quantity is counteracted by the torque reduction, which is caused by the controlling of the load torque. Thereby, the torque change (torque increase) caused by the misfire-avoidance control operation is limited.

Thereafter, when it is determined that the value of difference between the intake air quantity and the normal combustion lower limit value is equal to or larger than the threshold value at step 105, the misfire-avoidance control operation and the load torque control operation are terminated.

In contrast, when it is determined that the fuel cut control operation (the F/C control operation) is currently executed at step 104, the operation proceeds to step 108. At step 108, it is determined whether the cylinder-inflow EGR gas quantity is larger than the predetermined threshold value. When it is determined that the cylinder-inflow EGR gas quantity is larger than the threshold value, the operation proceeds to step 109. At step 109, the EGR gas scavenging control operation, which promotes the scavenging of the EGR gas, is executed by controlling the throttle opening degree to the opening side (e.g., the full opening side). In this way, the intake air quantity is increased to rapidly scavenge the EGR gas, which remains in the intake conduit 12.

Thereafter, the operation proceeds to step 110. At step 110, the load torque (e.g., the load torque of the alternator 48) is controlled to absorb, i.e., counteract the torque change caused by the EGR gas scavenging control operation. In this way, the torque increase caused by the EGR gas scavenging control operation, i.e., the torque increase caused by a reduction of a pumping loss is counteracted by the torque reduction, which is caused by the controlling of the load torque. In this way, the torque change (torque increase) caused by EGR gas scavenging control operation is limited.

In contrast, when the torque change caused by the EGR gas scavenging control operation cannot be absorbed, i.e., cannot be counteracted by the controlling of the load torque, the throttle opening degree is reduced. In this way, the torque increase caused by the EGR gas scavenging control operation can be reduced, and the torque change caused by the EGR gas scavenging control operation can be absorbed by the controlling of the load torque, i.e., the torque increase caused by the EGR gas scavenging control operation can be counteracted. As a result, the torque change, which is caused by the EGR gas scavenging control operation, can be reliably limited.

Thereafter, when it is determined that the cylinder-inflow EGR gas quantity is equal to or smaller than the threshold value at step 108, the EGR gas scavenging control operation and the load torque control operation are terminated. In this way, in the state where the scavenging of the EGR gas, which remains in the intake conduit 12, is substantially completed, and thereby the cylinder-inflow EGR gas quantity becomes equal to or smaller than the threshold value, the EGR gas scavenging control operation can be terminated. Thus, it is possible to limit the unnecessary lengthening of the EGR gas scavenging control operation.

Next, the estimating method for estimating the cylinder-inflow EGR gas quantity will be described in detail with reference to FIGS. 5 to 8.

As in the present embodiment, in the system that has the LPL EGR device 28, which recirculates the EGR gas to the portion of the intake conduit 12 located on the upstream side of the compressor 19 (the intake passage on the upstream side of the throttle valve 21), the ECU 36 computes (estimates) the cylinder-inflow EGR gas quantity as follows.

Figure 5:
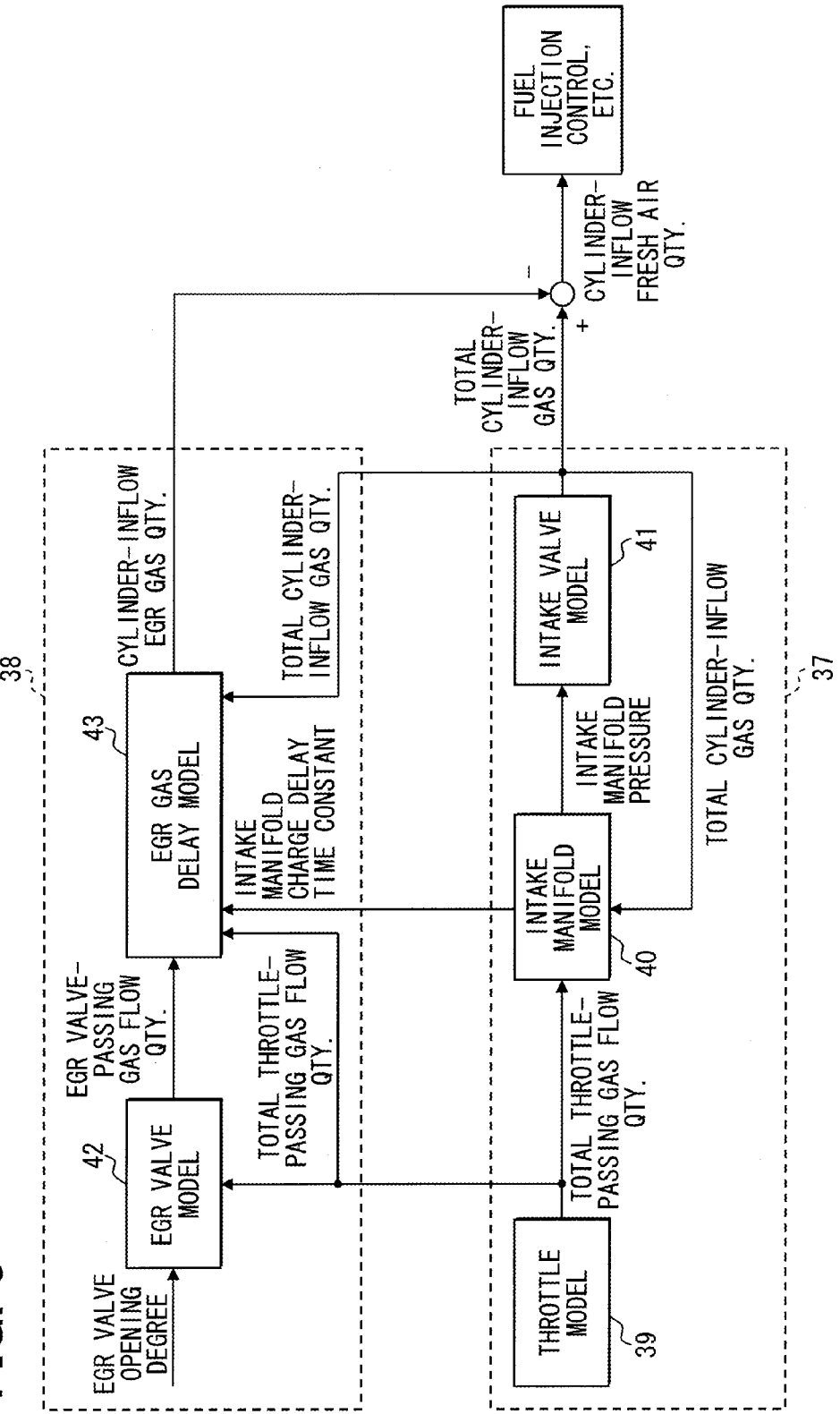
FIG. 5 is a block diagram for describing an EGR gas delay model according to the first embodiment.

As shown in FIG. 5, a total cylinder-inflow gas quantity computing portion 37 of the cylinder-inflow EGR gas quantity determining arrangement 36d of the ECU 36 computes a total throttle-passing gas flow quantity (a total quantity of gas that passes through the throttle valve 21) by using a throttle model 39. The throttle model 39 is a model that simulates the behavior of the gas in the intake conduit 12 at the time of passing through the throttle valve 21. For instance, a throttle model, which is recited in JP2008-101626A, may be used as the throttle model 39.

Thereafter, an intake manifold pressure (a pressure in the intake passage on the downstream side of the throttle valve 21) is computed based on the total throttle-passing gas flow quantity and a previous value of the total cylinder-inflow gas quantity by using an intake manifold model 40. The intake manifold model 40 is a model that simulates the behavior of the gas at the time of being charged into a portion (e.g., the surge tank 23 and the intake manifold 24) of the intake passage located on the downstream side of the throttle valve 21 after passing through the throttle valve 21. For instance, an intake conduit model, which is recited in JP2008-101626A, may be used as the intake manifold model 40.

Thereafter, the total cylinder-inflow gas quantity (=cylinder-inflow fresh air quantity+cylinder-inflow EGR gas quantity) is computed based on the intake manifold pressure by using an intake valve model 41. The intake valve model 41 is a model that simulates the behavior of the gas at the time of being drawn into the cylinder after being charged into the portion of the intake passage located on the downstream side of the throttle valve 21. An intake valve model, which is recited in JP2008-101626A, may be used as the intake valve model 41.

A cylinder-inflow EGR gas flow quantity computing portion 38 of the cylinder-inflow EGR gas quantity determining arrangement 36d of the ECU 36 computes an EGR valve-passing gas flow quantity (a flow quantity of the EGR gas, which passes through the EGR valve 31) by using an EGR valve model 42. The EGR valve model 42 is a model that simulates the behavior of the EGR gas at the time of passing through the EGR valve 31 in the EGR conduit 29.

Figure 6:
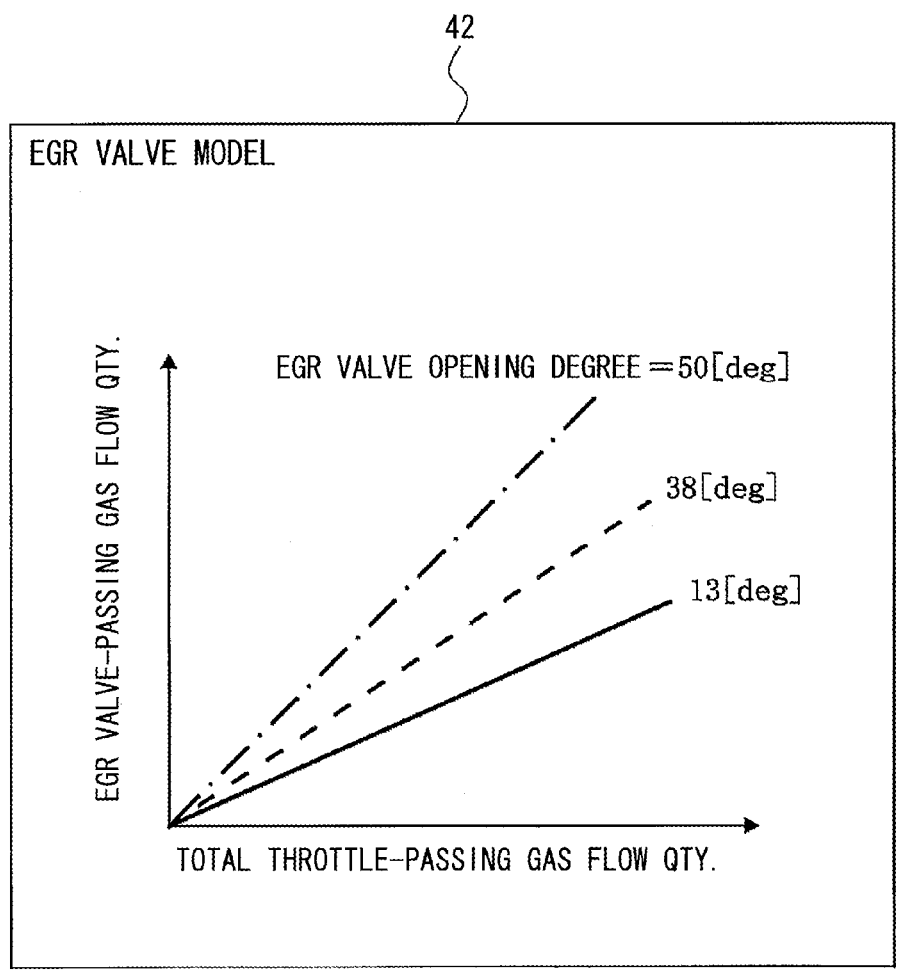
FIG. 6 is a diagram for describing an EGR valve model according to the first embodiment.

As shown in FIG. 6, the EGR valve model 42 is constructed as a map that defines a relationship among the opening degree of the EGR valve 31, the total throttle-passing gas flow quantity and the EGR valve-passing gas flow quantity. The EGR valve-passing gas flow quantity is computed based on the opening degree of the EGR valve 31 and the total throttle-passing gas flow quantity by using the map of the EGR valve-passing gas flow quantity. The map of the EGR valve-passing gas flow quantity is prepared in advance based on test data and design data and is prestored in the ROM of the ECU 36.

Alternatively, the EGR valve model 42 may be constructed as a mathematical or physics equation, which defines a relationship among the opening degree of the EGR valve 31, a pressure Pin on the upstream side of the EGR valve 31, a pressure Pout on the downstream side of the EGR valve 31 and the EGR valve-passing gas flow quantity Megr.

Specifically, the EGR valve model 42 may be approximated by using the following equation of a throttle (equation of an orifice).

$$Megr = C \cdot A \cdot \frac{Pin}{\sqrt{R \cdot Tegr}} \cdot \Phi(Pout/Pin)$$

In the above equation, C denotes a discharge coefficient, and A denotes an opening cross-sectional area of the EGR conduit 29, which changes in response to the opening degree of the EGR valve 31. Furthermore, R denotes a gas constant, and Tegr denotes a temperature of the EGR gas on the upstream side of the EGR valve 31. Furthermore, $\Phi(Pout/Pin)$ is a function that uses (Pout/Pin) as a variable.

In this case, the EGR valve-passing gas flow quantity Megr is computed based on the opening degree of the EGR valve 31, the pressure Pin on the upstream side of the EGR valve 31, the pressure Pout on the downstream side of the EGR valve 31, and the temperature of the EGR gas by using the equation of the throttle (the equation of the orifice) discussed above.

Thereafter, the cylinder-inflow EGR gas quantity is computed based on the computed value of the EGR valve-passing gas flow quantity by using an EGR gas delay model 43 (see FIG. 5). The EGR gas delay model 43 is a model that simulates the behavior of the EGR gas until the time of flowing into the cylinder by passing through the throttle valve 21 after passing through the EGR valve 31.

Figure 7:
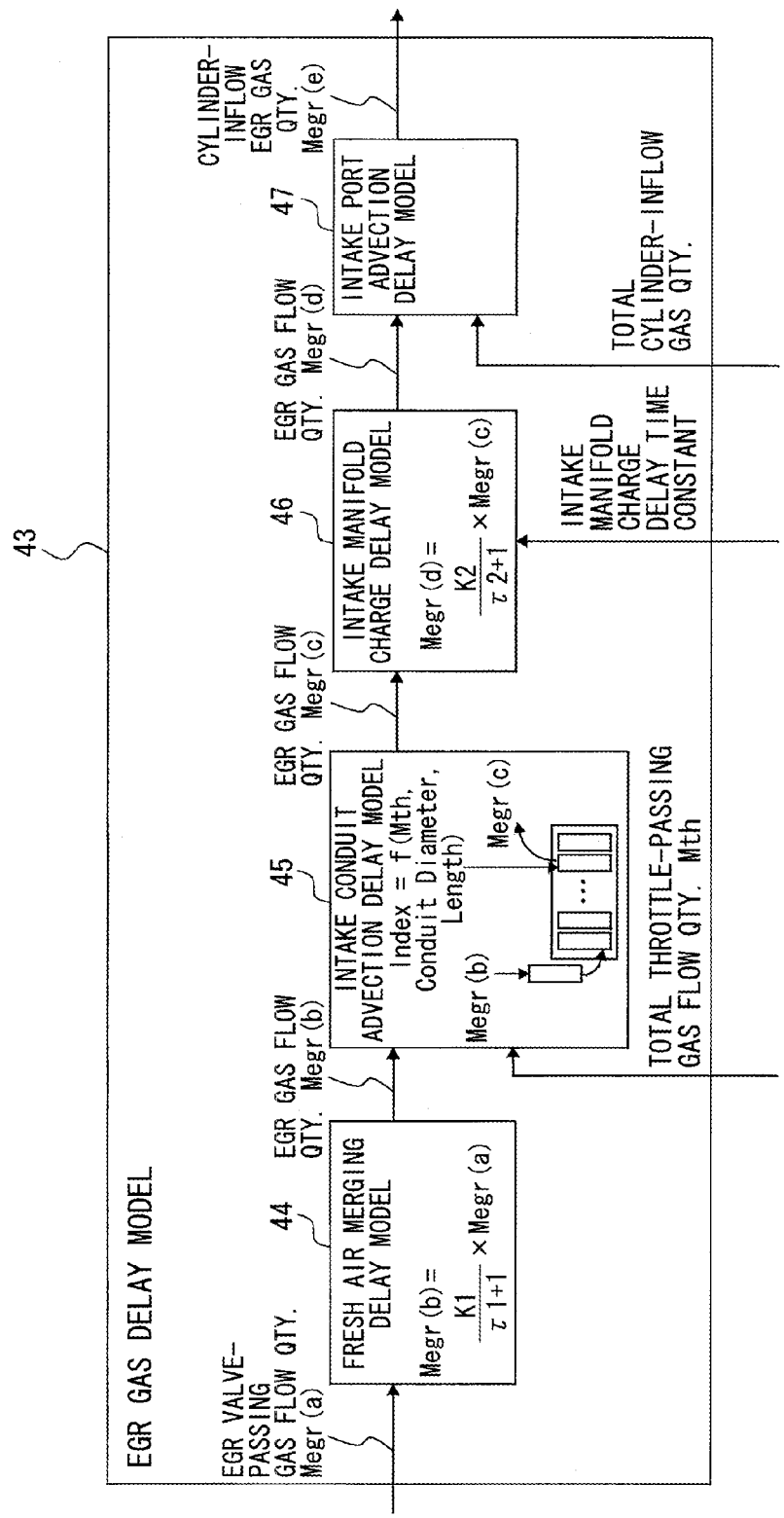
FIG. 7 is a block diagram for describing an EGR gas delay model according to the first embodiment.

As shown in FIG. 7, the EGR gas delay model 43 includes a fresh air merging delay model 44, an intake conduit advection delay model 45, an intake manifold charge delay model 46 and an intake port advection delay model 47. The fresh air merging delay model 44 is a model that simulates the behavior of the EGR gas at the time of flowing into a portion (a portion of the intake conduit 12 located on the upstream side of the compressor 19) of the intake passage located on the upstream side of the throttle valve 21 after passing through the EGR valve 31. The intake conduit advection delay model 45 is a model that simulates the behavior of the EGR gas until the time of passing through the throttle valve 21 after flowing into the portion of the intake passage located on the upstream side of the throttle valve 21. The intake manifold charge delay model 46 is a model that simulates the behavior of the EGR gas at the time of being charged into a portion (e.g., the surge tank 23 and the intake manifold 24) of the intake passage located on the downstream side of the throttle valve 21 after passing through the throttle valve 21. The intake port advection delay model 47 is a model that simulates the behavior of the EGR gas until the time of flowing into the cylinder through the intake port after being charged into the portion of the intake passage located on the downstream side of the throttle valve 21.

Thereby, the delay of the EGR gas that occurs at the time of flowing into the portion of the intake passage located on the upstream side of the throttle valve 21, the convection delay of the EGR gas that occurs until the time of passing through the throttle valve 21 after flowing into the portion of the intake passage located on the upstream side of the throttle valve 21, the charge delay of the EGR gas that occurs at the time of being charged into the portion of the intake passage located on the downstream side of the throttle valve 21 after passing through the throttle valve 21, and the convection delay of the EGR gas that occurs until the time of flowing into the cylinder through the intake port after being charged into the portion of the intake passage located on the downstream side of the throttle valve 21 can be reflected into the computation of the cylinder-inflow EGR gas quantity. Thus, the estimation accuracy of the cylinder-inflow EGR gas quantity can be improved.

At the time of computing the cylinder-inflow EGR gas quantity, an EGR gas flow quantity Megr(b), which is a flow quantity of the EGR gas that flows into the portion of the intake passage located on the upstream side of the throttle valve 21, is computed based on an EGR valve-passing gas flow quantity Megr(a) by using the fresh air merging delay model 44.

The fresh air merging delay model is approximated by using the following equation (1).

$$Megr(b) = [K1/(\tau 1 + 1)] \times Megr(a) \qquad \text{Equation (1)}$$

A coefficient K1 and the time constant $\tau 1$ of the above equation (1) are values that are determined based on a conduit diameter and a conduit length of the portion of the EGR conduit 29 (the portion of the EGR conduit 29 from the EGR valve 31 to a merging portion, at which the EGR conduit 29 is connected to the intake conduit 12) and the conduit diameter of the intake conduit 12. The coefficient K1 and the time constant $\tau 1$ are computed in advance based on the test data and the design data.

Thereafter, an EGR gas flow quantity Megr(c), which is a flow quantity of the EGR gas that passes through the throttle valve 21, is computed based on the EGR gas flow quantity Megr(b), which is the flow quantity of the EGR gas that flows into the portion of the intake passage located on the upstream side of the throttle valve 21, and the total throttle-passing gas flow quantity Mth by using the intake conduit advection delay model 45.

Figure 8:
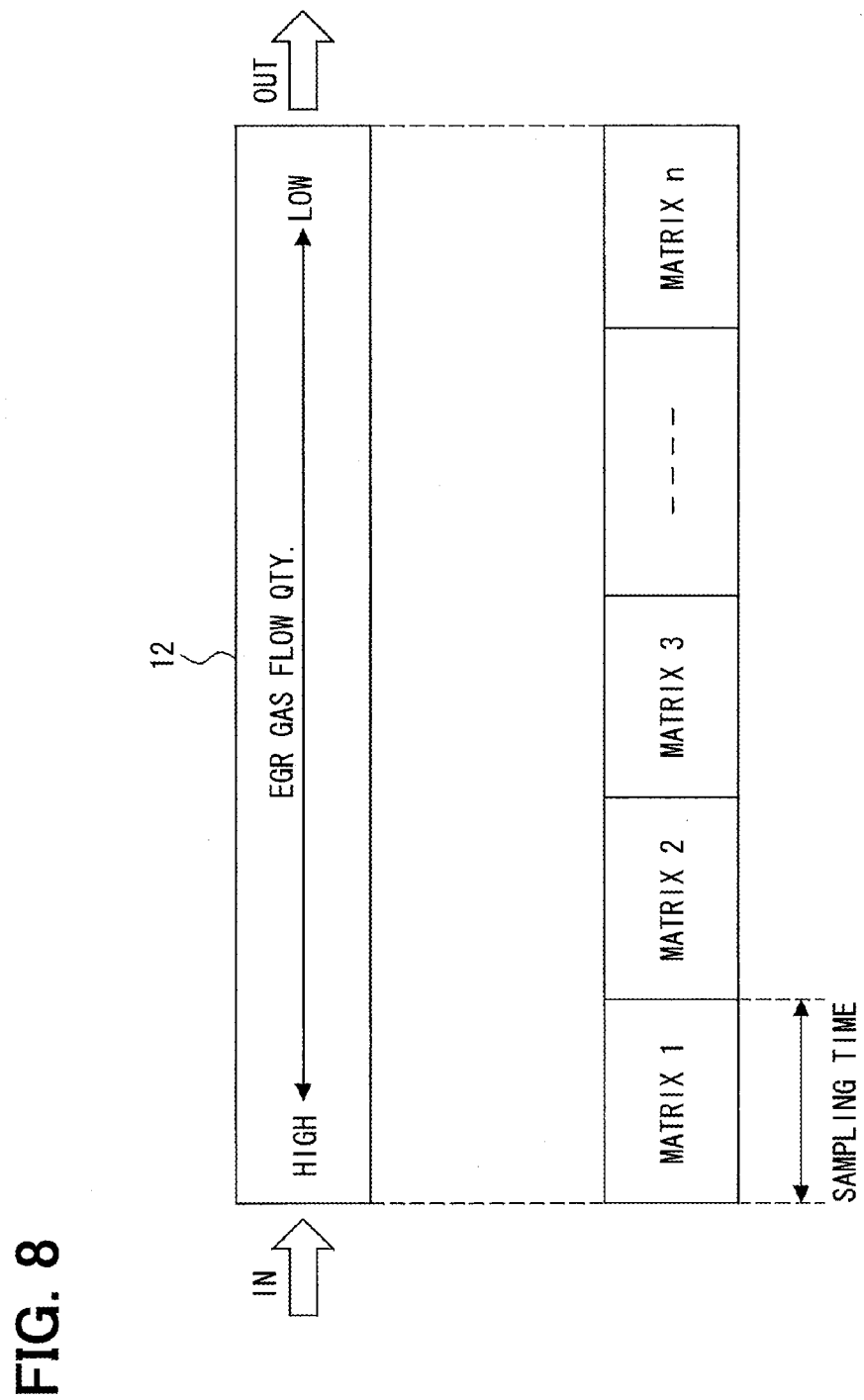
FIG. 8 is a diagram for describing an intake conduit advection delay model according to the first embodiment.

With reference to FIG. 8, the intake conduit advection delay model 45 is constructed as follows. Specifically, the behavior of the EGR gas of the continuous time system, which is measured until the time of passing through the throttle valve 21 after flowing into the portion of the intake passage located on the upstream side of the throttle valve 21, is transformed into a plurality of matrices, which are formed at predetermined time intervals through the discretization (e.g., 32 matrices, which are formed one after another at 16 millisecond sampling time intervals through the discretization). These matrices construct the intake conduit advection delay model 45 and form a queue, i.e., the first in first out (FIFO) data structure in the memory (rewritable memory or storage) of the ECU 36. Each matrix indicates the corresponding EGR gas flow quantity. In general, a moving speed of the EGR gas in the intake conduit 12 is sufficiently slow in comparison to the computation speed of the ECU 36, so that the intake conduit advection delay model 45 can be constructed by the matrices, which are formed one after another at the predetermined time intervals through the discretization. Various coefficients, which are used in the intake conduit advection delay model 45, are values that are determined based on a conduit diameter and a conduit length of a portion of the intake conduit 12 (the portion of the intake conduit 12 that is from the merging portion, at which the EGR conduit 29 is connected to the intake conduit 12, to the throttle valve 21) and are computed in advance based on the test data and the design data.

Thereafter, as shown in FIG. 7, the intake manifold charge delay model 46 is used to compute an EGR gas flow quantity Megr(d), which is a flow quantity of the EGR gas charged into the portion (e.g., the surge tank 23 and the intake manifold 24) of the intake passage located on the downstream side of the throttle valve 21, based on the EGR gas flow quantity Megr (c), which is the flow quantity of the EGR gas that passes through the throttle valve 21.

The intake manifold charge delay model 46 is approximated by using the following equation (2).

$$Megr(d) = [K2/(\tau 2 + 1)] \times Megr(c) \quad \text{Equation (2)}$$

A coefficient K2 and an intake manifold charge delay time constant τ2 of the above equation (2) are values that are determined based on, for example, a conduit diameter, a length and a volume of the portion (the portion, such as the surge tank 23 and the intake manifold 24, of the intake conduit 12 located on the downstream side of the throttle valve 21) of the intake passage located on the downstream side of the throttle valve 21. The coefficient K2 and the intake manifold charge delay time constant τ2 of the above equation (2) are computed in advance based on the test data and the design data. In a case where the intake manifold charge delay time constant is used in the intake manifold model 40, the intake manifold charge delay time constant, which is used in the intake manifold model 40, may be used in the intake manifold charge delay model 46.

Thereafter, the intake port advection delay model 47 is used to compute a cylinder-inflow EGR gas quantity Megr(e) based on the EGR gas flow quantity Megr(d), which is the flow quantity of the EGR gas charged into the portion of the intake passage located on the downstream side of the throttle valve 21, and the previous value of the total cylinder-inflow gas quantity.

The intake port advection delay model 47 is constructed as follows. Specifically, the behavior of the EGR gas of the continuous time system, which is measured until the time of flowing into the cylinder through the intake port after being charged into the portion of the intake passage located on the downstream side of the throttle valve 21, is transformed into a plurality of matrices, which are formed one after another at predetermined time intervals through discretization. These matrices construct the intake port advection delay model 47 and form a queue, i.e., the first in first out (FIFO) data structure in the memory of the ECU 36. Various coefficients, which are used in the intake port advection delay model 47, are values that are determined based on the conduit diameter and the conduit length of the corresponding portion of the intake conduit 12 and are computed in advance based on the test data and the design data.

In a system of a comparative example (related art) of FIG. 4B, which does not execute the misfire-avoidance control operation, when the throttle opening degree is controlled to the closing side at the time of decelerating the engine (see the time point, at which the accelerator opening degree is dropped to the smallest value, i.e., the amount of depression of the accelerator pedal is dropped to the smallest value in FIG. 4A), the intake air quantity is reduced, and the EGR gas remains in the intake passage. Therefore, at the time of deceleration or the time of reacceleration of the engine, the intake air quantity may possibly be reduced below the normal combustion lower limit value (the lower limit value of the intake air quantity that needs to be achieved to enable the normal combustion in the cylinder), thereby there is a high possibility of having the misfire in the cylinder.

In contrast, in the first embodiment shown in FIG. 4C, the cylinder-inflow EGR gas quantity is estimated by using the model, which simulates the behavior of the EGR gas flow quantity, and the normal combustion lower limit value is computed based on this estimated cylinder-inflow EGR gas quantity. At the time of decelerating the engine 11 (e.g., the time of changing the accelerator opening degree to the full closing side, i.e., the time, at which the amount of depression of the accelerator pedal is dropped to the smallest value in FIG. 4A), the throttle opening degree is controlled to the closing side. Thereafter, at a time point t1, at which a value of difference between the intake air quantity and the normal combustion lower limit value becomes smaller than the threshold value, the misfire-avoidance control operation is executed to avoid the misfire by controlling the throttle opening degree such that the intake air quantity does not decrease below the normal combustion lower limit value. In this way, the intake air quantity can be kept equal to or above the normal combustion lower limit value, and thereby the misfire at the time of decelerating the engine 11 can be limited.

Furthermore, the load torque (e.g., the load torque of the alternator 48) is controlled to absorb, i.e., counteract the torque change caused by this misfire-avoidance control operation. In this way, the torque increase caused by the misfire-avoidance control operation, i.e., the torque increase caused by the increase of the intake air quantity is counteracted by the torque reduction, which is caused by the controlling of the load torque. Thereby, the torque change (torque increase) caused by the misfire-avoidance control operation can be limited. As a result, the deterioration of the driveability at the time of deceleration of the engine 11 can be limited.

Thereafter, at a time point t2, at which the fuel cut control operation (F/C control operation) is started, the EGR gas scavenging control operation is executed by controlling the throttle opening degree to the opening side (e.g., the full opening side where the opening degree of the throttle valve 21 becomes the full opening degree) to promote the scavenging of the EGR gas from the intake conduit 12. In this way, the intake air quantity is increased during the fuel cut control operation (the F/C control operation), and thereby the EGR gas, which remains in the intake conduit 12, can be rapidly scavenged.

Furthermore, the load torque (e.g., the load torque of the alternator 48) is controlled to absorb, i.e., counteract the torque change caused by this misfire-avoidance control operation. In this way, the torque increase caused by the EGR gas scavenging control operation, i.e., the torque increase caused by the reduction of the pumping loss is counteracted by the torque reduction, which is caused by the controlling of the load torque. In this way, the torque change (torque increase) caused by the EGR gas scavenging control operation is limited. As a result, it is possible to limit the deterioration of the driveability during the fuel cut control operation (the F/C control operation).

Thereafter, at the time of reaccelerating the engine 11 (the time of reaccelerating the vehicle), at which the accelerator opening degree is increased, the fuel cut control operation is terminated (restarting the fuel injection). Then, at a time point t3, at which the value of difference between the intake air quantity and the normal combustion lower limit value becomes smaller than the threshold value once again, the misfire-avoidance control operation is executed to avoid the misfire by controlling the throttle opening degree such that the intake air quantity does not decrease below the normal combustion lower limit value. In this way, the intake air quantity can be kept equal to or above the normal combustion lower limit value, and thereby the misfire caused by the EGR gas at the time of reaccelerating the engine 11 can be limited.

Furthermore, the load torque (e.g., the load torque of the alternator 48) is controlled to absorb, i.e., counteract the torque change caused by this misfire-avoidance control operation. In this way, the torque increase caused by the misfire-avoidance control operation, i.e., the torque increase caused by the increase of the intake air quantity is counteracted by the torque reduction, which is caused by the controlling of the load torque. Thereby, the torque change (torque increase) caused by the misfire-avoidance control operation can be limited. As a result, the deterioration of the driveability at the time of reacceleration of the engine 11 can be limited.

In the first embodiment, at the time of executing the misfire-avoidance control operation, the throttle opening degree is controlled such that the intake air quantity falls in the predetermined range from the normal combustion lower limit value on the side, which is larger than the normal combustion lower limit value. Therefore, the excessive increase of the intake air quantity at the time of executing the misfire-avoidance control operation can be limited, and thereby the deterioration of the fuel economy can be limited.

In the first embodiment, the cylinder-inflow EGR gas quantity is computed (estimated) by using the model, which simulates the behavior of the EGR gas flow quantity. However, the method of estimating the cylinder-inflow EGR gas quantity is not limited to this method and may be modified in an appropriate manner. For example, the cylinder-inflow EGR gas quantity may be computed (estimated) based on an output signal of an intake conduit pressure sensor or an output signal of the air flow meter. Furthermore, the quantity of the EGR gas, which remains in the intake conduit 12, may be sensed with a sensor as information of the cylinder-inflow EGR gas quantity (cylinder-inflow EGR gas quantity information).

Second Embodiment

A second embodiment of the present disclosure will be described with reference to FIGS. 9 to 11B. In the following description, components similar to those of the first embodiment will not be described redundantly for the sake of the simplicity, and differences, which are different from those of the first embodiment, will be mainly discussed.

In the first embodiment, the normal combustion lower limit value is computed based on the cylinder-inflow EGR gas quantity. However, in the second embodiment, the ECU 36 executes a misfire-avoidance control routine, i.e., a misfire-avoidance control process of FIG. 9, so that a normal combustion determination value (a normal combustion threshold value) is computed based on the engine operational state, and the misfire-avoidance control operation is executed by controlling the throttle opening degree such that the intake air quantity does not decrease below the normal combustion determination value.

Figure 9:
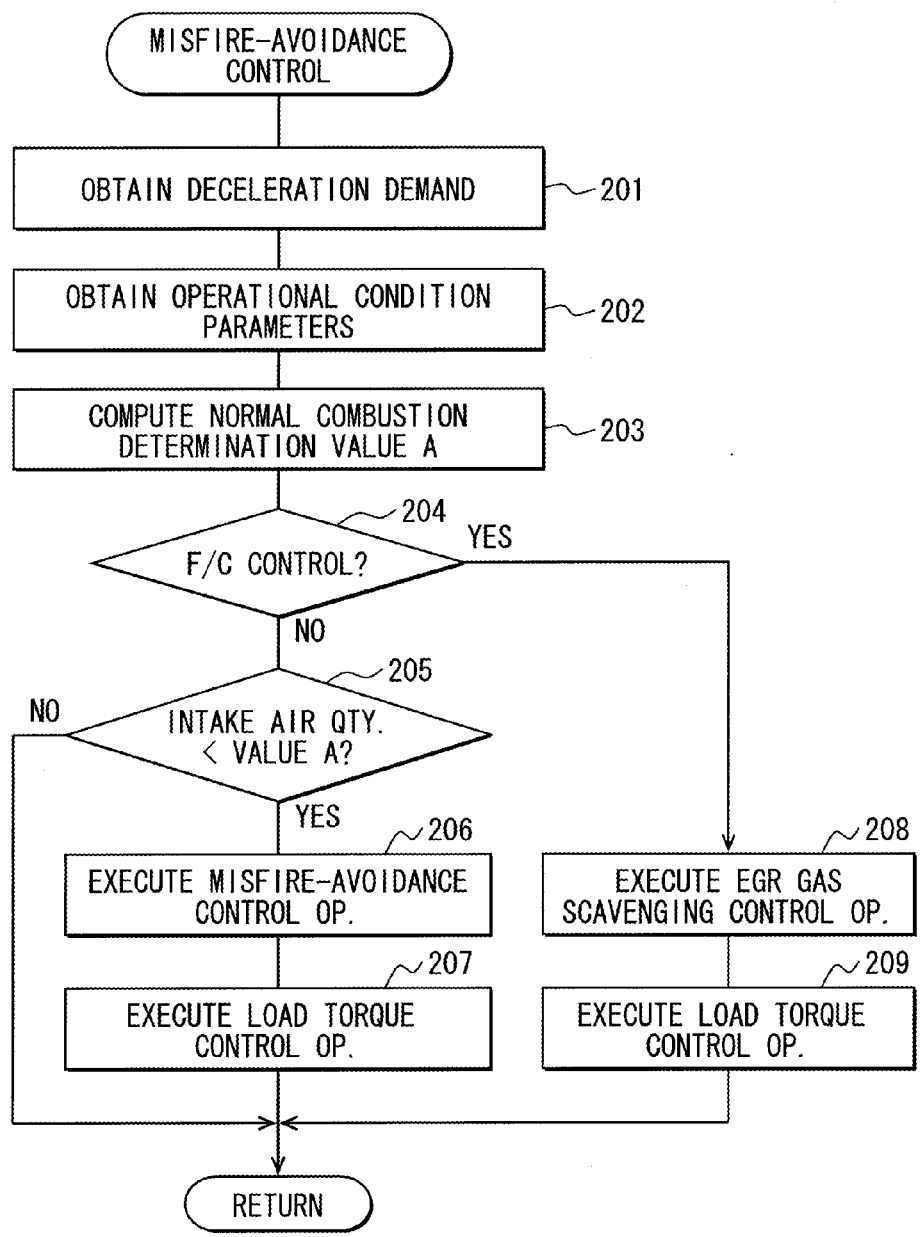
FIG. 9 is a flowchart showing a flow of a misfire-avoidance control routine according to a second embodiment of the present disclosure.

In the misfire-avoidance control routine, i.e., the misfire-avoidance control process of FIG. 9, when a deceleration demand, which demands the deceleration of the engine 11, is generated, the deceleration demand is obtained at step 201. Thereafter, the operation proceeds to step 202. At step 202, the engine operational condition parameters, such as the engine rotational speed and the engine load (e.g., the intake air quantity and the intake conduit pressure) are obtained. In this instance, like in the first embodiment, the intake air quantity information determining arrangement 36a of the ECU 36 senses or computes the intake air quantity (serving as the intake air quantity information) based on the output of the air flow meter 14.

Thereafter, the operation proceeds to step 203. At step 203, the normal combustion determination value A and a execution time period B for executing the misfire-avoidance control operation are computed based on the engine operational state (e.g., the engine rotational speed and the engine load) at the time of starting the deceleration of the engine 11 with reference to a map of the normal combustion determination value A and the execution time period B shown in FIG. 10. Here, for instance, the normal combustion threshold value computing arrangement 36b of the ECU 36 computes the normal combustion determination value A such that the normal combustion determination value A is kept slightly larger than the normal combustion lower limit value (the lower limit of the intake air quantity, which needs to be achieved to enable the normal combustion in the cylinder). Furthermore, the execution time period B of the misfire-avoidance control operation is set to, for example, a time period, which is required to complete the scavenging of the EGR gas remained in the intake conduit 12. The map of FIG. 10 is prepared in advance based on test data and design data and is prestored in the ROM of the ECU 36. In the map of FIG. 10, A1-A4 indicate corresponding normal combustion determination values, respectively, and B1-B4 indicate corresponding execution time periods, respectively.

Thereafter, the operation proceeds to step 204. At step 204, it is determined whether the fuel cut control operation (F/C control operation) is currently executed. When it is determined that the fuel cut control operation is not currently executed (i.e., the fuel injection is currently performed) at step 204, the operation proceeds to step 205. At step 205, it is determined whether the intake air quantity is smaller than the normal combustion determination value A. When the intake air quantity becomes smaller than the normal combustion determination value A, there is a high possibility of having the misfire. Therefore, it is possible to predict whether the misfire will occur by determining whether the intake air quantity is smaller than the normal combustion determination value A.

When it is determined that the intake air quantity is smaller than the normal combustion determination value A at step 205, the operation proceeds to step 206. At step 206, the misfire-avoidance control arrangement 36c of the ECU 36 executes the misfire-avoidance control operation from the time of starting the deceleration of the engine 11 until the end of the execution time period B from the time of starting the deceleration by controlling the throttle opening degree such that the intake air quantity is kept equal to or larger than the normal combustion determination value A. In this way, the intake air quantity is kept equal to or larger than the normal combustion determination value A to limit the occurrence of the misfire.

Thereafter, the operation proceeds to step 207. At step 207, the load torque (e.g., the load torque of the alternator 48) is controlled to absorb, i.e., counteract the torque change caused by the misfire-avoidance control operation.

In contrast, when it is determined that the fuel cut control operation (F/C control operation) is currently executed at step 204, the operation proceeds to step 208. At step 208, the EGR gas scavenging control operation is executed to promote the scavenging of the EGR gas by controlling the throttle opening degree to the opening side (e.g., the full opening side where the opening degree of the throttle valve 21 becomes the full opening degree).

Thereafter, the operation proceeds to step 209. At step 209, the load torque (e.g., the load torque of the alternator 48) is controlled to absorb, i.e., counteract the torque change caused by the EGR gas scavenging control operation. In contrast, when the torque change caused by the EGR gas scavenging control operation cannot be absorbed, i.e., cannot be counteracted by the controlling of the load torque, the throttle opening degree is reduced.

In the second embodiment discussed above, as shown in FIG. 11B, the normal combustion determination value A (the value that is slightly larger than the normal combustion lower limit value) is computed based on the engine operational state. When it is determined that the intake air quantity is smaller than the normal combustion determination value A, the misfire-avoidance control operation is executed to avoid the misfire by controlling the throttle opening degree such that the intake air quantity is kept equal to or larger than the normal combustion determination value A from the time of starting the deceleration of the engine 11 until the end of the execution time period B (the time period that is required to complete the scavenging of the EGR gas, which remains in the intake conduit 12). Therefore, the intake air quantity can be kept equal to or larger than the normal combustion determination value A at the time of deceleration and reacceleration of the engine 11 unlike the comparative example (related art) shown in FIG. 11A. As a result, it is possible to limit the occurrence of the misfire caused by the EGR gas at the time of deceleration or reacceleration.

In each of the first and second embodiments discussed above, at the time of controlling the load torque to absorb the torque change of the engine 11 caused by the misfire-avoidance control operation or the EGR gas scavenging control operation, the load torque of the alternator 48 is controlled. However, the present disclosure is not limited to this. For example, alternatively, the load torque may be controlled by driving an auxiliary device (e.g., a compressor of the air conditioning system, an electric fan) of the engine 11. Further alternatively, the load torque may be controlled by generating the brake force at the antilock brake system (ABS). Furthermore, the load torque may be controlled by stopping an operation of at least one of the cylinders.

In each of the first and second embodiments, the misfire-avoidance control operation is executed by controlling the throttle opening degree such that the intake air quantity does not decrease below the normal combustion threshold value (the normal combustion lower limit value or the normal combustion determination value). However, the present disclosure is not limited to this. For instance, a normal combustion threshold value (a normal combustion lower limit value or a normal combustion determination value), which is a threshold value of the engine torque (a required torque or an estimated torque) that needs to be achieved to enable the normal combustion in the cylinder, may be computed. Then, the misfire-avoidance control operation may be executed by controlling the throttle opening degree such that the engine torque does not decrease below this normal combustion threshold value.

In each of the first and second embodiments discussed above, the present disclosure is applied to the engine that is provided with the supercharger and the low pressure loop (LPL) EGR device 28, which recirculates the EGR gas from the portion of the exhaust conduit 15 located on the downstream side of the catalytic converter 16 to the portion of the intake conduit 12 located on the upstream side of the compressor 19. However, the present disclosure is not limited to such an engine. For example, the present disclosure may be applied to an internal combustion engine that is provided with a super charger and a high pressure loop (HPL) EGR device, which recirculates the EGR gas from a portion of the exhaust conduit located on an upstream side of the exhaust turbine to a portion of the intake conduit located on a downstream side of the throttle valve.

Furthermore, the present disclosure is not limited to the engine, which is provided with the exhaust turbine supercharger (i.e., the turbocharger). For instance, the present disclosure may be applied to an internal combustion engine, which is provided with a mechanical supercharger or an electric supercharger.

Furthermore, the present disclosure is not limited to the engine, which is provided with the supercharger. That is, the present disclosure may be applied to a normal aspiration engine (NA engine), which is not provided with a supercharger.

In the first and second embodiments, the intake air quantity information determining arrangement 36a senses or computes the intake air quantity as the intake air quantity information. Alternatively, the intake air quantity information determining arrangement 36a may sense or compute the torque of the internal combustion engine as the intake air quantity information. In such a case, the misfire-avoidance control arrangement 36c may execute the misfire-avoidance control operation such that the value of the intake air quantity information (torque) does not decrease below the corresponding normal combustion threshold value.

Additional advantages and modifications will readily occur to those skilled in the art. The present disclosure in its broader terms is therefore not limited to the specific details, representative apparatus, and illustrative examples shown and described.

What is claimed is:

1. A control apparatus for an internal combustion engine that is provided with an exhaust gas recirculation (EGR) device, which recirculates a portion of exhaust gas of the internal combustion engine as EGR gas to an intake passage of the internal combustion engine, the control apparatus comprising:
    an intake air quantity information determining arrangement that senses or computes one of an intake air quantity and a torque of the internal combustion engine as intake air quantity information;
    a normal combustion threshold value computing arrangement that computes a normal combustion threshold value based on an operational state of the internal combustion engine, wherein the normal combustion threshold value is a threshold value of the intake air quantity information required to be achieved to enable normal combustion in the internal combustion engine; and
    a misfire-avoidance control arrangement that executes a misfire-avoidance control operation, which avoids misfire by controlling a throttle opening degree of a throttle valve such that a value of the intake air quantity information does not decrease below the normal combustion threshold value.

2. The control apparatus according to claim 1, wherein the misfire-avoidance control arrangement controls a load torque such that a torque change of the internal combustion engine, which is caused by the misfire-avoidance control operation, is absorbed by the load torque.

3. The control apparatus according to claim 1, further comprising a cylinder-inflow EGR gas quantity determining arrangement that estimates or senses a value of a cylinder-inflow EGR gas quantity, which is a quantity of the EGR gas that flows into a cylinder of the internal combustion engine, wherein the normal combustion threshold value computing arrangement computes the normal combustion threshold value based on the value of the cylinder-inflow EGR gas quantity.

4. The control apparatus according to claim 1, when the misfire-avoidance control arrangement executes the misfire-avoidance control operation, the misfire-avoidance control arrangement controls the throttle opening degree of the throttle valve such that the value of the intake air quantity information falls in a predetermined range from the normal combustion threshold value on a side, which is larger than the normal combustion threshold value.

5. The control apparatus according to claim 1, wherein the misfire-avoidance control arrangement executes an EGR gas scavenging control operation, which promotes scavenging of the EGR gas by controlling the throttle opening degree toward an opening side during a fuel cut control operation, which stops fuel injection at a time of decelerating the internal combustion engine.

6. The control apparatus according to claim 5, wherein the misfire-avoidance control arrangement controls a load torque such that a torque change, which is caused by the EGR gas scavenging control operation, is absorbed by the load torque.

7. The control apparatus according to claim 6, wherein the misfire-avoidance control arrangement reduces the throttle opening degree in a case where a torque change, which is caused by the EGR gas scavenging control operation, cannot be absorbed through the controlling of the load torque.

8. The control apparatus according to claim 5, further comprising a cylinder-inflow EGR gas quantity determining arrangement that estimates or senses a value of a cylinder-inflow EGR gas quantity, which is a quantity of the EGR gas that flows into a cylinder of the internal combustion engine, wherein the misfire-avoidance control arrangement terminates the EGR gas scavenging control operation when the value of the cylinder-inflow EGR gas quantity becomes equal to or smaller than a predetermined threshold value during execution of the fuel cut control operation.

9. The control apparatus according to claim 3, wherein:
the cylinder-inflow EGR gas quantity determining arrangement estimates and stores a value of an EGR gas flow quantity of a portion of the EGR gas that is present between a first location of the intake passage, which is on a downstream side of an EGR valve of the EGR device, and a second location of the intake passage, which is on an upstream side of the cylinder, based on an EGR valve-passing gas flow quantity, which is a quantity of the portion of the EGR gas passed through the EGR valve; and
the cylinder-inflow EGR gas quantity determining arrangement estimates the value of the cylinder-inflow EGR gas quantity based on the stored value of the EGR gas flow quantity of the portion of the EGR gas.

* * * * *